N. A. Patterson. Cider Mill.

No. 119,472. Patented Oct. 3, 1871.

119,472

UNITED STATES PATENT OFFICE.

NEWTON A. PATTERSON, OF KNOXVILLE, TENNESSEE, ASSIGNOR TO HIMSELF AND M. L. PATTERSON, OF SAME PLACE.

IMPROVEMENT IN CIDER-MILLS.

Specification forming part of Letters Patent No. 119,472, dated October 3, 1871; antedated September 15, 1871.

*To all whom it may concern:*

Be it known that I, NEWTON A. PATTERSON, of Knoxville, in the county of Knox and State of Tennessee, have invented a new and useful Improvement in Cider-Mill; and I do hereby declare that the following is a full, clear, and exact description thereof, which will enable others skilled in the art to make and use the same, reference being had to the accompanying drawing forming part of this specification.

Figure 1:
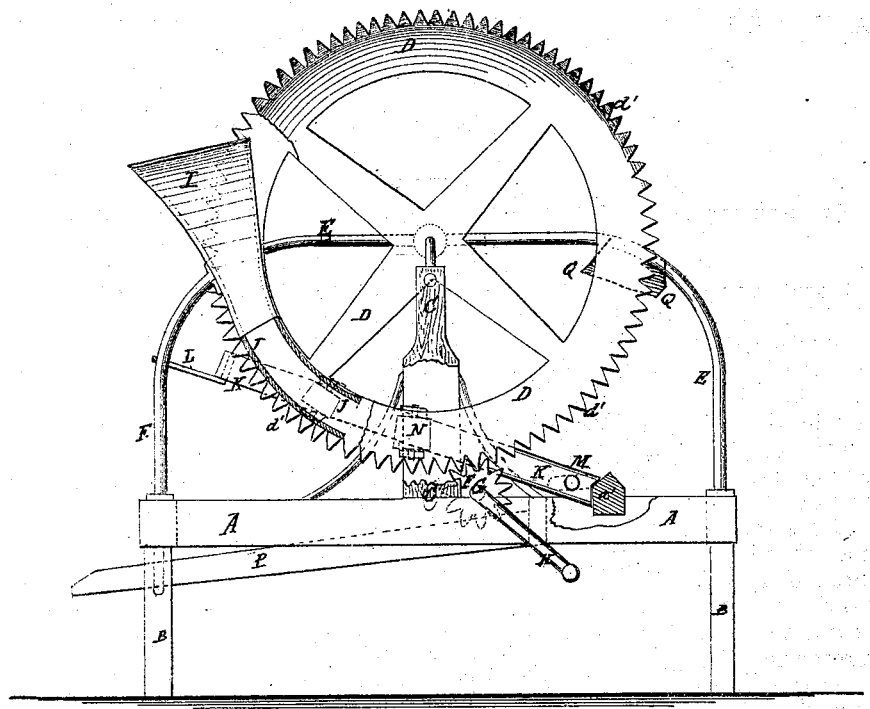
Figure 2:
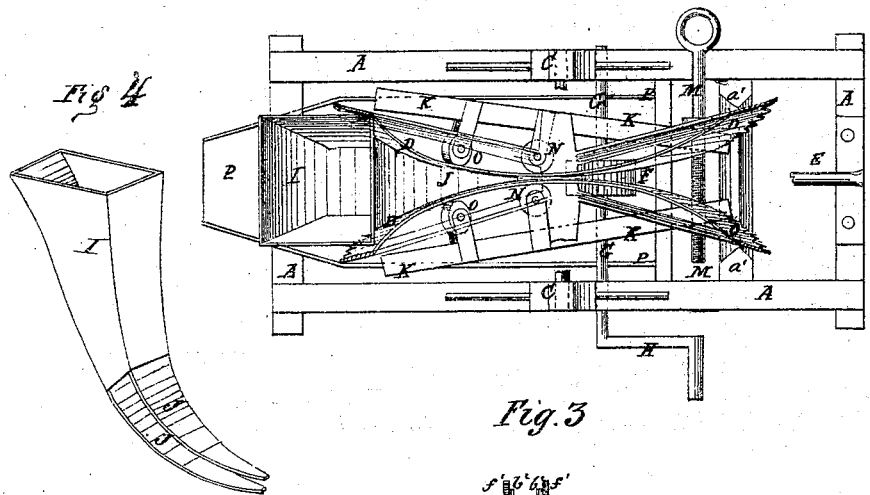
Figure 3:

Figure 1 is a side view of my improved mill, parts being broken away to show the construction. Fig. 2 is a top view of the same, partly in section, to show the construction. Fig. 3 is a detail view, representing a modified form of the pinion-wheel. Fig. 4 represents a perspective and detail view of my improved spring-fork, for receiving and guiding the apples in single file to the grinders.

Similar letters of reference indicate corresponding parts.

My invention relates to cider-mills; and consists in a new way of delivering the apples singly to the grinders by holding them in the prongs of a spring-fork, located on the hopper-spout, until the two disks each grasp the apple simultaneously on both sides and transfers it between their converging surfaces.

A is the base; B, legs; and C, standard. D represents grinders located on separate shafts, inclined toward each other, and driven by pinions working in cogs on their own peripheries or in any other well-known way. These grinding-wheels are curved so as to bring them gradually closer and closer together at the bottom until they attain their greatest proximity; this being done they again gradually diverge in the same manner. I is an ordinary hopper, to which is attached, at the bottom, my new form of conveyer, J, which has bifurcated and elastic prongs for a portion of its length. K are notched bars, hinged to supports L, and having guide-rollers N N and O O attached, as shown. P is the juice-receiving trough. Q is a scraper, which takes the pomace off the grinders as they revolve and allows it to be dropped upon the ground.

The mode of operation is as follows: The apples being thrown promiscuously into the hopper in the ordinary manner they pass down in single file within the prongs of the spring-fork. Here the foremost is arrested and held until the rotation of the grinders brings their corresponding surfaces into contact with its sides. It is now borne forward individually, and gradually crushed as it is transferred, until it reaches the point of greatest proximity of said grinders. Then the crushing ceases, the juice is all approximately expressed, and the pomace carried round on the grinders until it drops or is removed by he scrapers.

Having thus described all that is necessary to a full understanding of my invention, what I claim as new, and desire to protect by Letters Patent, is—

The conveyer J, attached to the bottom of the hopper, and having bifurcated and elastic prongs for a portion of its length, as and for the purpose specified.

N. A. PATTERSON.

Witnesses:
LEWIS TILLMAN, Jr.,
D. VAN LEW.